US012091060B2

(12) United States Patent
Reshef et al.

(10) Patent No.: US 12,091,060 B2
(45) Date of Patent: Sep. 17, 2024

(54) AUTONOMOUS LOOK AHEAD METHODS AND SYSTEMS (71) Applicant: GM GLOBAL TECHNOLOGY OPERATIONS LLC, Detroit, MI (US)

(72) Inventors: Roi Reshef, Tel Aviv (IL); Zahy Bnaya, Petach Tikva (IL); Vlad Goldner, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 623 days.

(21) Appl. No.: 17/444,321

(22) Filed: Aug. 3, 2021

(65) Prior Publication Data
US 2023/0044344 A1 Feb. 9, 2023

(51) Int. Cl.
*B60W 60/00* (2020.01)
*B60W 50/00* (2006.01)
*B60W 50/10* (2012.01)

(52) U.S. Cl.
CPC ...... *B60W 60/007* (2020.02); *B60W 50/0097* (2013.01); *B60W 50/10* (2013.01); *B60W 2520/10* (2013.01); *B60W 2520/12* (2013.01); *B60W 2540/215* (2020.02); *B60W 2552/00* (2020.02); *B60W 2552/30* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 2019/0258251 A1* | 8/2019 | Ditty | G06V 20/58 |
| 2020/0379461 A1* | 12/2020 | Singh | G06N 3/088 |
| 2021/0009128 A1* | 1/2021 | Jokela | B60W 50/0097 |
| 2021/0192874 A1* | 6/2021 | Morrisey, IV | B60W 60/0011 |
| 2021/0303882 A1* | 9/2021 | Mallela | B60W 60/00256 |
| 2022/0306111 A1* | 9/2022 | Kuroki | B60W 30/16 |

* cited by examiner

*Primary Examiner* — James J Lee
*Assistant Examiner* — Wenyuan Yang
(74) *Attorney, Agent, or Firm* — Lorenz & Kopf LLP (57) ABSTRACT

Methods and systems are provided for controlling an autonomous vehicle. In one embodiment, a method includes: identifying, by a processor, at least one constraint on a longitudinal dimension of an upcoming road; defining, by the processor, constraint activation logic based on a type of the at least one constraint; performing, by the processor, the constraint activation logic to determine a state of the constraint to be at least one of active and inactive; when the state of the constraint is active, validating, by the processor, a motion plan of the autonomous vehicle based on the constraint; and selectively controlling the autonomous vehicle based on the validating of the motion plan.

17 Claims, 5 Drawing Sheets

AUTONOMOUS LOOK AHEAD METHODS AND SYSTEMS

INTRODUCTION

The technical field generally relates to methods and systems for controlling an autonomous vehicle, and more particularly relates to methods and systems to constrain driving polices with a lookahead that is based on environmental rules.

An autonomous vehicle is a vehicle that is capable of sensing its environment and navigating with little or no user input. An autonomous vehicle senses its environment using sensing devices such as inertial measurement units, radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Autonomous agents drive in an environment in which they must obey traffic rules such as: slowing down for speed limits, stopping for stop signs, yielding for traffic and more. As a result, autonomous driving policies must include a lookahead component that assures compliance to those rules or constraints within and beyond its planning horizon. Accordingly, it is desirable to provide a framework to constrain driving policies with a lookahead based on environmental conditions or rules. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for controlling an autonomous vehicle. In one embodiment, a method includes: identifying, by a processor, at least one constraint on a longitudinal dimension of an upcoming road; defining, by the processor, constraint activation logic based on a type of the at least one constraint; performing, by the processor, the constraint activation logic to determine a state of the constraint to be at least one of active and inactive; when the state of the constraint is active, validating, by the processor, a motion plan of the autonomous vehicle based on the constraint; and selectively controlling the autonomous vehicle based on the validating of the motion plan.

In various embodiments, the validating comprises validating the motion plans within a defined horizon of the autonomous vehicle based on a desired velocity of the motion plan.

In various embodiments, the validating further comprises validating the motion plan beyond the defined horizon of the autonomous vehicle based on a terminal pose of the motion plan.

In various embodiments, the validating is further based on back propagating limitations of the constraint to the terminal pose.

In various embodiments, the constraint activation logic defines the state of the constraint as active based on a determined point of no return, wherein the point of no return is determined based on a braking distance that is based on all possible velocities of the autonomous vehicle and a position of the constraint.

In various embodiments, the constraint activation logic defines the state of the constraint as active when the autonomous vehicle has not reached the point of no return for a current velocity.

In various embodiments, the constraint activation logic defines the state of the constraint as active when the autonomous vehicle has reached or passed the point of no return for a current velocity and plan is predicted as safe for a determined worst case scenario.

In various embodiments, the method further includes identifying the constraint type of the constraint to be a physical stop-bar that relates to a stop-sign.

In various embodiments, the constraint activation logic defines the state of the constraint as active until a feedback is received from the driver to override a plan.

In various embodiments, the constraint activation logic defines the state of the constraint as active until the vehicle is determined to be at a stop for a predetermined time.

In various embodiments, the method further includes identifying, by the processor, the constraint type of the constraint to be a virtual stop bar that relates to a traffic control device.

In various embodiments, the constraint activation logic defines the state of the constraint as active when the status of the light is flashing yellow or displays red.

In various embodiments, the method includes identifying, by the processor the constraint type of the constraint to be a virtual bar created at the front of a yield-to-traffic maneuver.

In various embodiments, the constraint activation logic defines the state of the constraint as active based on predictions of other vehicles in a connecting lane.

In various embodiments, identifying, by the processor, the constraint type of the constraint to be a point along a rounded curve that limits a maximum driving speed.

In another embodiment, a system for controlling a vehicle is provided. The system includes: an input device that receives information indicative of at least one constraint on a longitudinal dimension of an upcoming road; and a control module configured to, by a processor, define constraint activation logic based on a type of the at least one constraint, perform the constraint activation logic to determine a state of the constraint to be at least one of active and inactive, when the state of the constraint is active, validate a motion plan of the autonomous vehicle based on the constraint, and selectively control the autonomous vehicle based on the validating of the motion plan.

In various embodiments, the control module is further configured to, by the processor, determine the type of the constraint to be one of a physical stop-bar that relates to a stop-sign, a virtual stop bar that relates to a traffic control device, a virtual bar created at the front of a yield-to-traffic maneuver, and a point along a rounded curve that limits a maximum driving speed.

In various embodiments, the control module is configured to validate the motion plans within a defined horizon of the autonomous vehicle based on a desired velocity of the motion plan and validate the motion plan beyond the defined horizon of the autonomous vehicle based on a terminal pose of the motion plan.

In various embodiments, the control module is configured to validate the motion plan beyond the defined horizon based on back propagating limitations of the constraint to the terminal pose.

In various embodiments, the control module is configured to define the state of the constraint as active based on a determined point of no return, wherein the point of no return is determined based on a braking distance that is based on all possible velocities of the autonomous vehicle and a position of the constraint.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
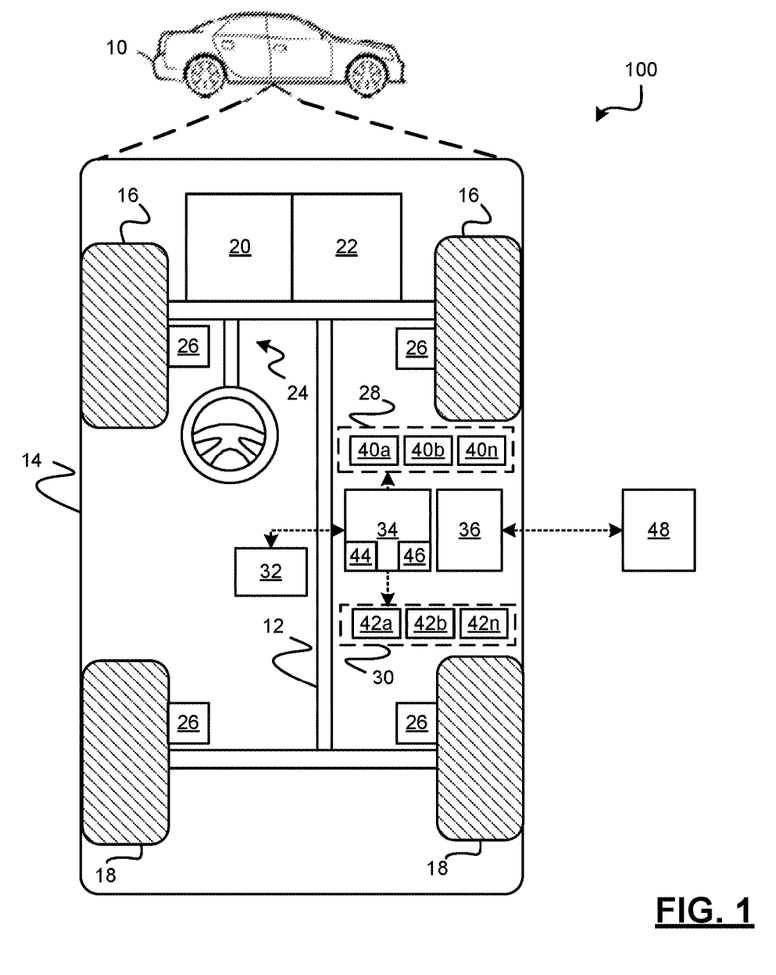
FIG. 1 is a functional block diagram illustrating an autonomous vehicle having a motion plan validation system, in accordance with various embodiments.

With reference to FIG. 1, a motion plan validation system shown generally at 100 is associated with a vehicle 10 in accordance with various embodiments. In general, the motion plan validation system 100 provides a framework to constrain driving policies with a lookahead based on environmental conditions or rules. Moreover, policies are evaluated and validated or invalidated regardless of the planning approach employed. The motion planning system thus, intelligently controls the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the motion plan validation system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
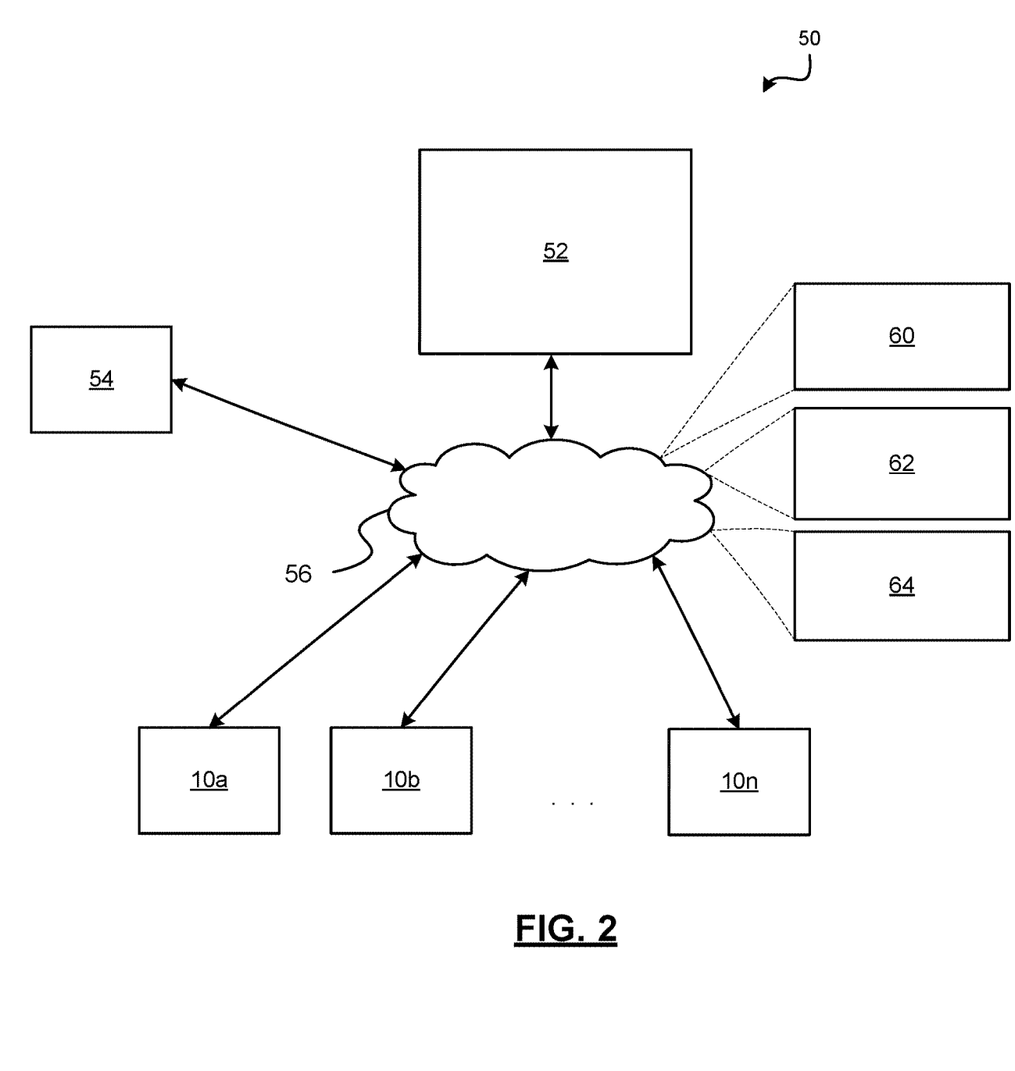
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the motion plan validation system 100 and, when executed by the processor 44 identify a physical or virtual constraint on the longitudinal dimension of the road (such as a speed constraint including both a position and a velocity constraint). This may be a physical stop-bar that relates to a nearby stop-sign (always on), a virtual stop bar that relates to a traffic control device (toggled according to device's state), a point along a rounded curve that limits max driving speed, or a virtual bar created at the front of a yield-to-traffic maneuver. Thereafter, the instructions define constraint activation logic and identify the activation state to be one of active or non-active. As will be discussed in more detail below, if the constraint is determined to be active, the instructions validate motion plans against the limits at the designated longitudinal positions of the constraint—both within the vehicle's planned horizon and beyond the planned horizon or invalidate motion plans that do not adhere to the limits.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site, or they could be remotely located from one another, each base station could be responsible for a single cell tower, or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62 but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
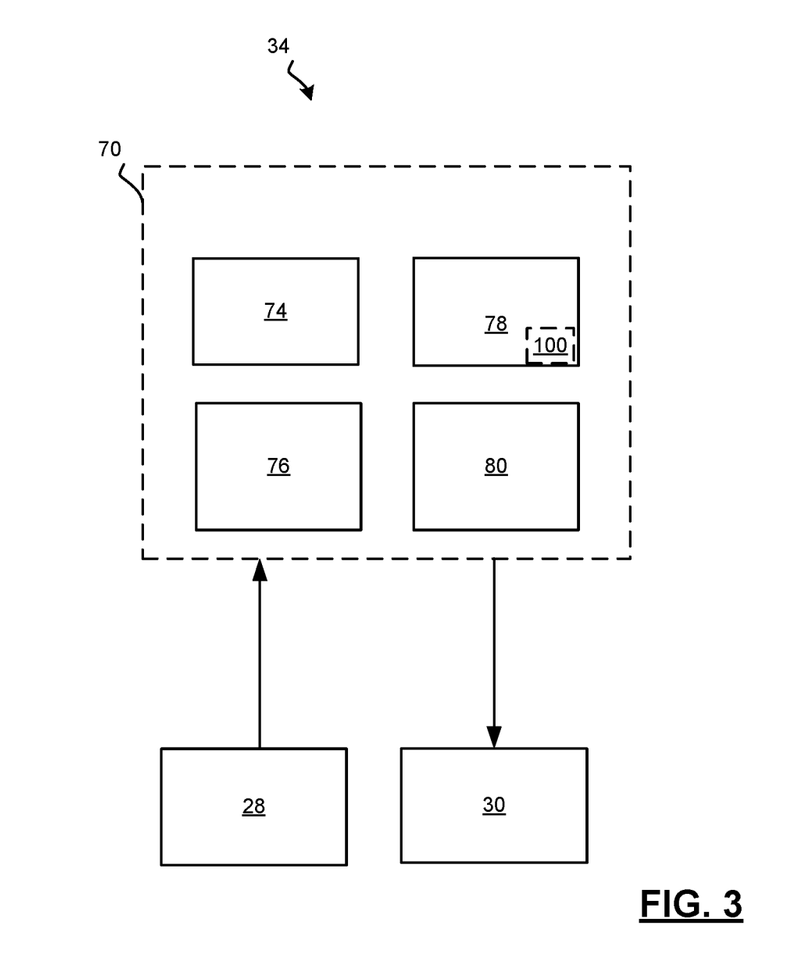
FIG. 3 is a functional block diagram illustrating an autonomous driving system of the autonomous vehicle and incorporating the motion plan validation, in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the motion plan validation system 100 of FIG. 1 is included within the ADS 70, for example, as a separate system or as part of the guidance system 78. In various embodiments, as shown in more detail with regard to FIG. 4 and with continued reference to FIG. 3, the motion plan validation system 100 includes a constraint identification module 102, a constraint state determination module 104, and a validation module 106. It will be understood that various embodiments of the motion plan validation system 100 according to the present disclosure may include any number of sub-modules embedded within the controller 34 which may be combined and/or further partitioned to similarly implement systems and methods described herein. Furthermore, inputs to the motion plan validation system 100 may be received from the sensor system 28, retrieved from the data storage device 32, received from other control modules (not shown) associated with the autonomous vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 4:
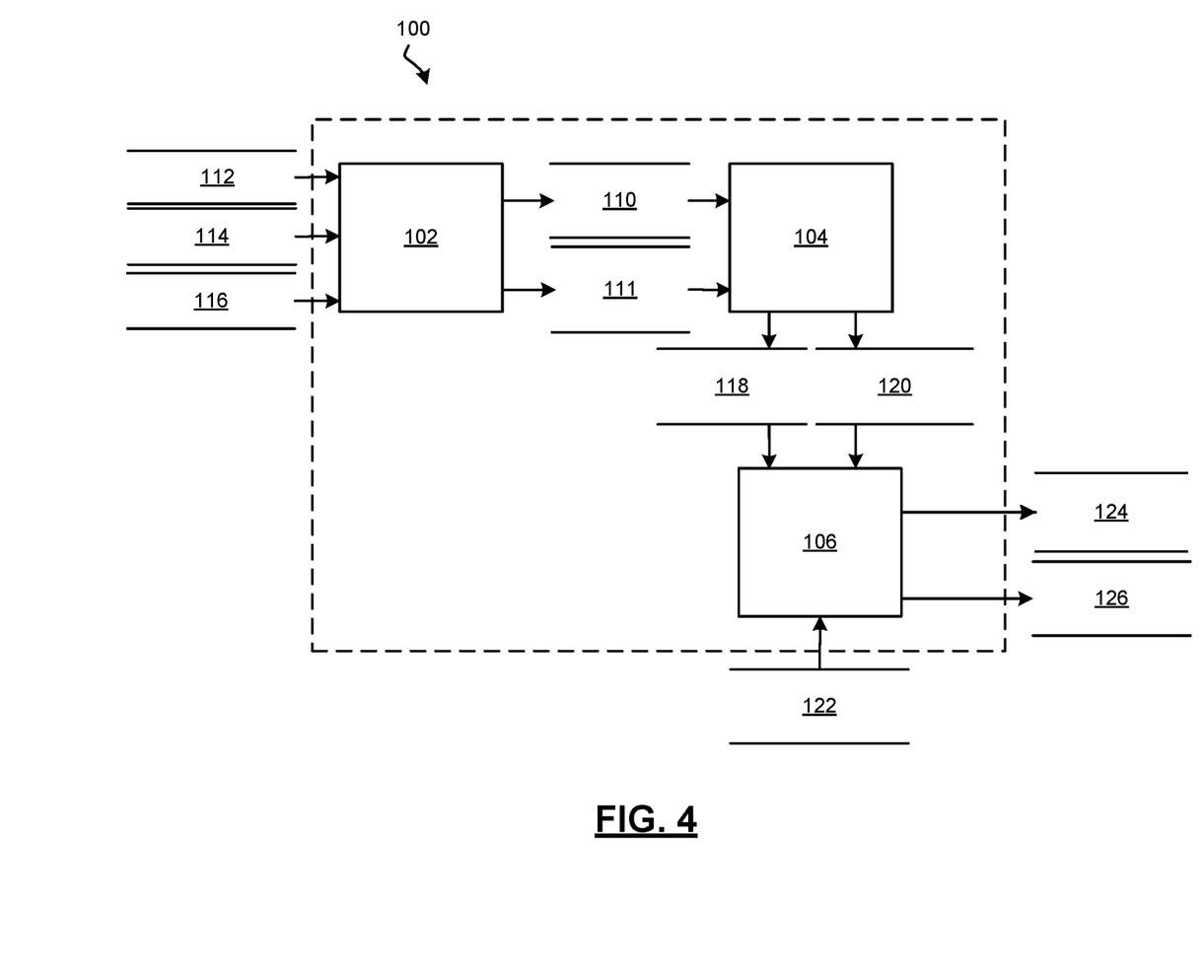
FIG. 4 is a diagram illustrating the motion plan validation system, in accordance with various embodiments.

In various embodiments, the constraint identification module 102 identifies a physical or virtual speed related constraint at a longitudinal position of the road and generates constraint type data 110 and constraint position data 111 based thereon. As discussed above, the constraint types can be, but are not limited to, a physical stop-bar that relates to a nearby stop-sign, a virtual stop bar that relates to a traffic control device, a point along a rounded curve that limits max driving speed, a virtual bar created at the front of a yield-to-traffic maneuver, etc. In various embodiments, the constraint identification module 102 determines the constraint type and position based on map data 112 stored in the data storage device 46 of the vehicle 10, based on road information 114 received from other vehicles or infrastructure, for example, ahead of the vehicle 10, and/or based on sensor data 116 generated by the sensing devices 40a-40n of the vehicle 10.

In various embodiments, the constraint state determination module 104 defines constraint activation logic based on the constraint type data 110 and performs the logic to identify a constraint state 118. In various embodiments the constraint activation logic defines the constraint state 118 to be active or inactive. For example, when the constraint type data 110 indicates the constraint type is a virtual bar created at the front of a yield-to-traffic maneuver, the constraint state determination module 104 first determines a point of no return (PoNR), then determines a worst case scenario based on other actors in the area, and generates a heuristic plan based on the worst case scenario. In various embodiments, the constraint state determination module 104 determines the PoNR as a virtual location $s_i$ that is based on an offset from the actual location of the stop-constraint indicated by the constraint position data 111. The offset is computed backwards from the position of the stop constraint using every possible velocity $v_{[T]}$ that the vehicle 10 may be at. The offset relates to a braking distance $D(v_{[T]}, 0)$.

In various embodiments, the constraint state determination module 104 determines that the vehicle 10 can safely commit to execute a motion plan and thus sets the constraint state 118 to inactive when either of the following conditions apply over the vehicle's terminal state: $s_{[T]}+D(v_{[T]}, 0)<=s_i$ (the vehicle has not reached the PoNR; or $s_{[T]}+D(v_{[T]}, 0)>s_i$ (the vehicle has crossed the PoNR) and there exists a safe plan π from this terminal state under the worst-case prediction. The constraint state determination module 104 sets the constraint state 118 to inactive when there does not exists a safe plan π from this terminal state under the worst-case prediction.

When the constraint type data 110 indicates that the constraint type is a point along a rounded curve that limits a maximum driving speed, points along the longitude of the driven lane are sampled with some frequency. For each sampled point i, the longitude along the lane $s_i$ and the curvature $K_i$ of the center curve of (or any baseline curve along) that lane (dictated by road's geometry and therefore can be cached offline) are stored. The curvature values are transformed to longitudinal speed limits based on a desired max lateral acceleration limit $$A_{max}^{lat}: v_i = \sqrt[2]{\frac{A_{max}^{lat}}{K_i}}.$$

These longitudinal speed limits are then used to compute the braking distances and evaluate the PoNR to set the constraint state 118 as discussed above.

When the constraint type data 110 indicates that the constraint type is a virtual stop bar that relates to a traffic control device, the positions and velocities $\{(s_1, v_1) (s_k, v_k)\}$ are collected for traffic control devices that are determined to be active. For example, a traffic control device such as a stop-sign is always considered active until a feedback from the driver is sent to override the plan, or alternatively, the vehicle 10 has been at a full stop for some sufficient time period. In another example, a traffic control device such as a yield-sign is dynamically toggled between active and inactive based on the state and predictions of other vehicles in connecting lanes. In still another example, a traffic control device such as a traffic light is considered as active as long as the light is flashing yellow or displays full red.

In various embodiments, the validation module 106 validates motion plans against speed limits at the designated longitudinal positions of the constraint—both within its horizon and beyond its horizon. The validation module 106 invalidates any motion plans that do not adhere to the limits. For example, the validation module compares a desired velocity from the motion plan data 122 to the active constraints. When the desired velocity is less than or equal to all active constraints within the defined horizon, the motion plan is validated for the horizon and horizon validation data 124 is generated. However, when the desired velocity is greater than at least one active constraint within the defined horizon, the motion plan is invalidated for the horizon.

In another example, the validation module 106 validates the motion plan beyond the horizon based on a terminal pose of the motion plan indicated by the motion plan data 122. For example, motion plans are of limited horizon in nature. Each plan has a terminal pose for the vehicle 1 to target. Accordingly, $(s_{[T]}, v_{[T]})$ is the longitudinal position and velocity at time T that represents the end pose of a trajectory candidate. If there are active constraints identified beyond that terminal pose, the constraints including the set of all k speed related constraints $\{(s_1, v_1) \ldots (s_k, v_k)\}$ are propagated back to the terminal pose $(s_{[T]}, v_{[T]})$ to guarantee no future "dead-end" situation occurs. A predefined kinematic model of deceleration (e.g., that reflects an emergency brake) is used for the propagation. For example, $D(v_{[T]}, v_i)$ is the minimal distance to travel required to transition from velocity $v_{[T]}$ to $v_i$ using a predefined deceleration profile. Thus, the motion plan is validated "beyond-horizon" when: $\forall_{i \in 1 \ldots k}: s_{[T]}+D(v_{[T]}, v_i)<=s_i, (s_i>s_{[T]})$ and beyond horizon validation data 126 is generated.

Figure 5:
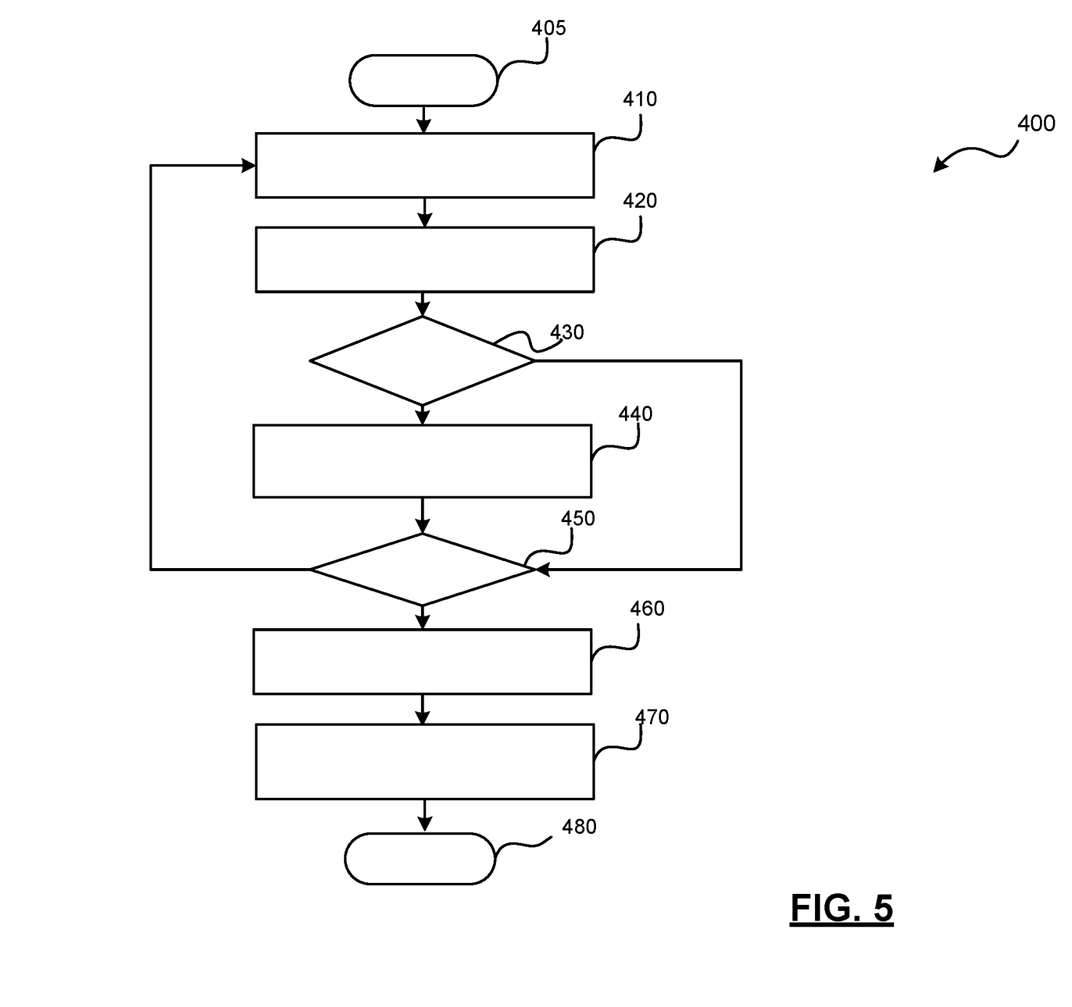
FIG. 5 is a flowchart illustrating a method for validating motion plans of the autonomous vehicle, in accordance with various embodiments.

Referring now to FIG. 5, and with continued reference to FIGS. 1-4, a flowchart illustrates a control method 400 that can be performed by the motion plan validation system 100 of FIG. 1 in accordance with the present disclosure. As can be appreciated in light of the disclosure, the order of operation within the method is not limited to the sequential execution as illustrated in FIG. 5 but may be performed in one or more varying orders as applicable and in accordance with the present disclosure. In various embodiments, the method 400 can be scheduled to run based on one or more predetermined events, and/or can run continuously during operation of the autonomous vehicle 10.

In one embodiment, the method may begin at 405. A constraint is identified at 410. Thereafter, it is determined whether the constraint is active at 420. For example, the PoNR method as discussed above is performed based on the constraint type where: when it is determined that the vehicle has not passed the PoNR, then the state is set to not active, when it is determined that the vehicle has passed the PoNR, a worst case scenario is determined. It is then determined whether a safe plan for this worst case scenario can be established. When a safe plan for the worst case scenario can be established, the state is set to not active. When a safe plan for the worst case scenario cannot be established, the state is set to active.

When the constraint is determined to be active at 430, the kinematic limitations of the active constraint are extracted at 440 and it is determined whether other constraints exist at 450. When the constraint is determined to be not active at 430, it is determined whether other constraints exist at 450.

When other constraints exist at 450, the method continues with identifying the constraints at 410. When no additional constraints exist at 450, motion plans within the horizon are validated based on the kinematic limitations of the constraint at 460 and motion plans beyond the horizon are validated based on the kinematic limitations of all active constraint at 470, for example as discussed above. Thereafter, the method may end at 480.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an autonomous vehicle, comprising:
    identifying, by a processor, at least one constraint on a longitudinal dimension of an upcoming road;
    defining, by the processor, constraint activation logic based on a type of the at least one constraint;
    performing, by the processor, the constraint activation logic to determine a state of the constraint to be at least one of active and inactive;
    when the state of the constraint is active, validating, by the processor, a motion plan of the autonomous vehicle based on the constraint; and
    selectively controlling the autonomous vehicle based on the validating of the motion plan;
    wherein the constraint activation logic defines the state of the constraint as active based on a determined point of no return, wherein the point of no return is determined based on a braking distance that is based on all possible velocities of the autonomous vehicle and a position of the constraint; and
    wherein the constraint activation logic defines the state of the constraint as active when the autonomous vehicle has not reached the point of no return for a current velocity.

2. The method of claim 1, wherein the validating comprises validating the motion plans within a defined horizon of the autonomous vehicle based on a desired velocity of the motion plan.

3. The method of claim 2, wherein the validating further comprises validating the motion plan beyond the defined horizon of the autonomous vehicle based on a terminal pose of the motion plan.

4. The method of claim 3, wherein the validating is further based on back propagating limitations of the constraint to the terminal pose.

5. The method of claim 1, the constraint activation logic further defines the state of the constraint as active when the autonomous vehicle has reached or passed the point of no return for a current velocity and plan is predicted as safe for a determined worst case scenario.

6. The method of claim 1, further comprising identifying the constraint type of the constraint to be a physical stop-bar that relates to a stop-sign.

7. The method of claim 6, wherein the constraint activation logic defines the state of the constraint as active until a feedback is received from the driver to override a plan.

8. The method of claim 6, wherein the constraint activation logic defines the state of the constraint as active until the vehicle is determined to be at a stop for a predetermined time.

9. The method of claim 1, further comprising identifying, by the processor, the constraint type of the constraint to be a virtual stop bar that relates to a traffic control device.

10. The method of claim 9, wherein the constraint activation logic defines the state of the constraint as active when the status of the light is flashing yellow or displays red.

11. The method of claim 1, further comprising identifying, by the processor the constraint type of the constraint to be a virtual bar created at the front of a yield-to-traffic maneuver.

12. The method of claim 11, wherein the constraint activation logic defines the state of the constraint as active based on predictions of other vehicles in a connecting lane.

13. The method of claim 1, further comprising identifying, by the processor, the constraint type of the constraint to be a point along a rounded curve that limits a maximum driving speed.

14. A system for controlling a vehicle, comprising:
one or more sensors that receive information indicative of at least one constraint on a longitudinal dimension of an upcoming road; and
a control module configured to, by a processor, define constraint activation logic based on a type of the at least one constraint, perform the constraint activation logic to determine a state of the constraint to be at least one of active and inactive, when the state of the constraint is active, validate a motion plan of the autonomous vehicle based on the constraint, and selectively control the autonomous vehicle based on the validating of the motion plan;
wherein the control module is configured to define the state of the constraint as active based on a determined point of no return, wherein the point of no return is determined based on a braking distance that is based on all possible velocities of the autonomous vehicle and a position of the constraint; and
wherein the constraint activation logic defines the state of the constraint as active when the autonomous vehicle has not reached the point of no return for a current velocity.

15. The system of claim 14, wherein the control module is further configured to, by the processor, determine the type of the constraint to be one of a physical stop-bar that relates to a stop-sign, a virtual stop bar that relates to a traffic control device, a virtual bar created at the front of a yield-to-traffic maneuver, and a point along a rounded curve that limits a maximum driving speed.

16. The system of claim 14, wherein the control module is configured to validate the motion plans within a defined horizon of the autonomous vehicle based on a desired velocity of the motion plan and validate the motion plan beyond the defined horizon of the autonomous vehicle based on a terminal pose of the motion plan.

17. The system of claim 16, wherein the control module is configured to validate the motion plan beyond the defined horizon based on back propagating limitations of the constraint to the terminal pose.

* * * * *